Patented July 22, 1930

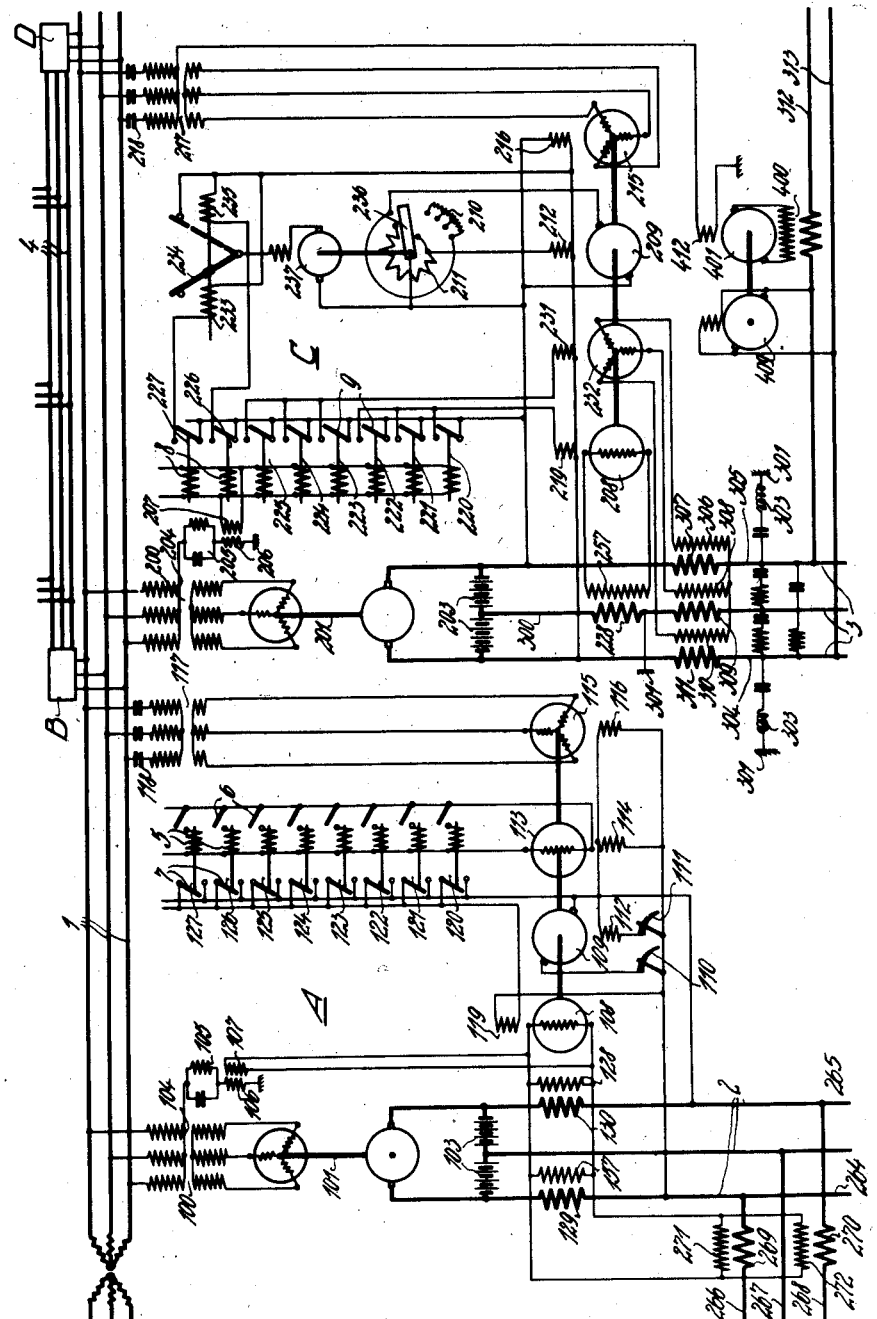

1,771,135

UNITED STATES PATENT OFFICE

OTTO MUCK, OF MUNICH-GROSSHADERN, GERMANY

REMOTE CONTROL PLANT FOR EXTENSIVE POWER-DISTRIBUTING SYSTEMS

Application filed March 1, 1929, Serial No. 343,813, and in Germany July 1, 1927.

My invention relates to a remote control plant for extensive power distributing systems, which are fed from an alternating current system common to them, more particularly from a three-phase system through converter stations.

In its narrower sense my invention relates to a remote control plant for such direct current systems, in which the control currents are superposed on the system or network conductors and the resonant receiving relay responding to the frequency of the superposed currents is connected to the system conductors. The connection preferably takes place through condensers, in order to block the receiving apparatus against the direct current.

My invention relates more specifically to such a remote control plant in which control currents of certain frequencies differing from the frequency of the system currents are superposed on the system conductors and in which the receiving relay is tuned to certain frequencies and responds on arrival of these control currents to these frequencies only.

In direct current networks or systems, which are supplied from a common alternating current line through converter stations a definite district or section of the network or system is coordinated to each converter station. These sections are as a rule inter-linked at a plurality of points or they are inter-connected by equalizer or exchange lines. These exchange lines are sometimes switched off at certain periods or under certain operating conditions. In the superposition upon such direct current systems or control currents the following difficulties arise:

If the entire direct current network is superposed by control currents from a single centrally located station, very high voltage drops develop in the control circuits on account of the great length of the superposed conductors, with the result that the receiving apparatus connected to the remote parts or extremities of the system receive practically no appreciable control voltage and consequently do not respond with certainty. In the immediate vicinity of the point of superposition, on the other hand, the network voltage is increased to an impermissibly high extent by the superposed voltage. Sections of the network, which are temporarily isolated from neighboring sections receive, furthermore, no control currents at all during the time they are cut off and the receiving apparatus of these sections cannot be operated. If, on the other hand, a superposition apparatus is installed in each converter station to supply only the section apportioned to that station with control current, it can, on account of the multiple interlinking of the individual sections, not be avoided that the control currents of one section flow into the nearby sections and there disturb the station and the receiving apparatus controlled by it.

If storage batteries are connected to the direct current network such batteries act like a short-circuit for the control current, so that thus at least the nearby receiving relays receive no control voltage. An unnecessary loss of control power may also occur for the reason that part of the direct current network may be connected with plants, which should not be supplied with superposed currents.

The object of my invention is to eliminate these aforementioned defects.

According to my invention from a central control station control currents of a frequency different from the network frequency are superposed on the common alternating current network. Along the alternating current network and the direct current network substations are distributed. To each converter station is, for instance, apportioned one substation and in the substations means are provided adapted to absorb the control power from the alternating current network and to superpose stronger control power of a frequency alike for all substations and of the proper phase on the voltage of the direct current networks.

The coincidence of frequency and phase of the control voltages superposed by the substations may be attained by installing booster apparatus in the substations, which absorb the control energy from the alternating current network and by taking up mechanical or electrical energy transmit a greater control energy of equal frequency and equal phase of the voltage to the direct current network. The synchronous machines of the individual substations and the control station are then automatically maintained in synchronism by exchange or equaliizng currents, which flow through the alternating current system, according to well known laws. In order that these equalizing or exchange currents should not attain excessively high values, the regulating and starting devices for the driving motors of the superposition units are so designed and adjusted, that they can be operated simultaneously from the control station and work as far as possible in synchronism.

If it is desired to superpose a control current on the direct current network, the normally inoperative superposing generators may, for instance, be regulated for this frequency from the control station, and rendered operative as soon as this frequency has been attained. The generators may be rendered operative by connecting the generator usually disconnected from the network to the network, or by switching in the normally disconnected field winding of this generator, or by keeping the speed of this generator, which normally varies rapidly, on a definite value for a certain time.

In order to prevent control power losses through batteries or by leakage into non-superposed sections of the network, sources of voltage are connected in the conductors leading to the batteries or to such network sections, which sources produce a counter voltage of equal frequency but opposite phase to the superposed voltage. In this way the network sections may be completely blocked against the control currents and the object of my invention, to avoid high voltage drops in the control circuits, be attained.

My invention will be better understood on referring to the drawing affixed hereto and showing an embodiment of my invention by a diagram of connections.

In this diagram direct current networks or systems 2, 3, 4, more or less interlinked with one another, are fed by a common three-phase alternating current network 1 through the converter stations A, B, C, D. Details of the connections are shown at the converter stations A and C only. Here the feeding of the direct current network takes place through the transformers 100 respectively 200 and the converter sets 101 respectively 201. The direct current networks 2, 3 are designed as three-wire networks with the batteries 103, 203 as voltage dividers. To the respective star points 104, 204 of transformers 100, 200 are connected the windings 106, 206 of superposition transformers across tunable oscillating circuits 105, 205.

The other winding 107 of this transformer in the station A is connected to the single-phase control generator 108. The generator 108 is driven by the motor 109 with the starter 110 in the armature circuit and the speed regulator 111 in the circuit of the field winding 112. With the shaft of the motor 109 is also coupled the auxiliary generator 113 with the field winding 114 and the coupled synchronous machine 115 with the field winding 116. The synchronous machine 115 is connected to the three-phase network 1 through the transformer 117 and the condensers 118. The auxiliary generator 113 is connected with one pole to one of the ends of the relay windings 5 of the selector-switches 120 to 127, with the other pole to the hand-operated switches 6 belonging to the relay; 7 are the switches operated by the relay.

The relays 120 to 127 are tuned to different frequencies, in such a manner that each relay responds and closes the switch 7 co-ordinated to it only when the auxiliary generator 113 generates a current of the pertaining relay frequency, under the assumption that the coresponding manual switch 6 is closed. The switches 7, which are connected in parallel, are contained in the circuit of the field winding 119 of the control generator 108.

At the station C the second winding 207 of the superposition transformer is connected to the windings 8 of the selector switches 220 to 227 connected in parallel. The selective relays 8 of these switches are tuned respectively to the same frequencies, as the corresponding relays 5 at the station A. They therefore close the respective switches 9 only if the winding 207 delivers a control current of the corresponding frequency. The switches of the relays 220 to 222, which are connected in parallel, are contained in the circuit of the field winding 219 of the single-phase superposition generator 208, the switches of the relays 223 to 225 are connected in the circuit of the field winding 231 of the three-phase superposition generator 232, the switch of the relay 226 is connected to the magnet winding 235 of the contactor 234, and the switch of the relay 227 with the magnet winding 233 of this contactor. The generators 208, 232 and the synchronous machine 215 with the field winding 216 are driven by the motor 209 with the field winding 212. 210 are the starting resistances for the armature circuits of this motor, 211 is the regulating resistance for the field winding 212. The crank 236 common to both resistances 210, 211 is driven by the regulation gear motor 237.

The superposition generator 208 is connected to one winding 257 of a superposition transformer, the other winding 228 of which is connected to the neutral conductor 300 of the direct current network 3. The neutral is grounded at 301.

The apparatus operates in the following manner, the station A being assumed as control, master or main station and the station C and the stations B, D as substations.

In the control station A the control unit consisting of the machines 108, 109, 113, 115 is brought to a definite speed by the motor 109. The manual switch 6 of the selector switch 126 is then closed and now the auxiliary generator 113 is allowed to run through the frequency of the selector switch 126 by varying the speed of the motor 109. As soon as this frequency is attained the coil of switch 126 is energized and the field winding 119 of control generator 108 which has now the same frequency as generator 113, is switched in by the corresponding switch 7 and through the windings 107, 106, the oscillating circuit 105 and, the star point 104 of the transformer 100, a control current of this frequency is superposed on the three-phase network 1. It passes through the star point 204 of the transformer 200, the oscillating circuit 205, the windings 206, 207 to the corresponding selector switch 226. When this switch responds the winding 235 of the switching contactor 234 is excited, the regulating gear motor 237 is switched in thereby and turns the crank 236 in a clockwise direction. The motor 209 is first started with the resistance 210 in circuit and is then adjusted for a definite speed by means of a resistance 211. As soon as the desired speed is attained the manual switch of the selector 126 is opened at the control station A and the manual switch of the selector 127 closed.

The generator 113 is now allowed to pass through the relay frequency of this switch, and as soon as this is attained the field winding of generator 108 is switched in again, a control impulse of that new frequency is transmitted over the three-phase network 1 to the selector 227 of the substation C. When this selector responds the winding 233 of the contactor 234 is switched in and the regulating motor 237 switched off, because the manual switch of selector 126 is now open. Now the synchronous machine 115 is synchronized with the synchronous machine 215 by regulating the speed of the driving motor 109 in the control station through the transformers 117, 217 and the condensers 118, 218, whereby the frequency of auxiliary generator 113 is correspondingly changed. This latter change in frequency has however no effect upon selectors 120—127, because at that time all hand switches of these selectors are open. After the synchronization the control generator 108 and the superposition generator 208 run at the same speed, and thus generate the same frequencies. If the frequency is now permitted to traverse a definite range and the selector switch 121, for instance, at the central station is closed, a control impulse is again transmitted to the corresponding selector switch 221 of the substation when this frequency is traversed. When this selector switch responds the field winding 219 of the superposition generator 208 is switched in and a control current of the same frequency is impressed upon the direct current network 301 by the windings 257, 228 of the superposition transformer. To this control current respond, for instance, the relays 303, which are connected between the outers 304, 305 of the direct current network and the ground 301. When these relays respond any switching operations may be performed, for instance a lighting plant may be switched in. In the same manner control currents of different frequency might be introduced into the direct current networks for the purpose of operating the selector switches 120, 122.

By such control currents the speed regulators 211 may also be adjusted for the corresponding speed by means of frequency relays.

What holds good for the substation C also applies to the substations B and D. Even the main control station A may be designed as superposition station. For this purpose the transformer windings 157, 128 are connected across the generator 108. They induce in the secondary windings 129, 130 connected in the outer conductors 264, 265 of the three wire system control voltages, which are superposed on the direct current network 2. The conductors 266, 267, 268 leading to a section of the network, which should not be superposed, are blocked against the control currents by the magnet windings 269, 270 being connected in the outer conductors 266, 268 and in which by the control generator 108 by means of the windings 271, 272 countervoltages are induced of equal frequency but opposite phase to those in windings 129, 130.

If the direct current network is equipped with steel armored cables, it is very difficult to pass control current of for instance 500 cycles through them.

According to my invention control frequencies of less than 300 cycles are employed in such cases; comparatively few frequencies are thus available for operating the receiving relays. This drawback may be eliminated by using polyphase superposed currents, which are impressed upon the conductors of the direct current network 3 by the control generator 232 and the transformer windings 306 to 311, besides the single-phase superposed currents, which in the substation C are impressed, for instance, upon the neutral 300 by the transformer windings 257, 228. By the three-phase control currents other relays may then be operated than by the single-phase control currents. If the three-phase superposition generator 332 is to be used for superposing, the selector switches 123 to 125 in the control station A are then used selectively, the selector switches 223 to 225 then respond at the individual frequencies and cut in the field winding 231 of this generator.

In the substation C are section of the network 312, 313 is superposed by means of the transformer 400 and the booster 401, which is driven by the motor 409. The field winding 412 of the machine 401 is connected to the network 1 across the neutral of the transformer 217 and the condensers 218. The machine 401 consists, for instance, of a unipolar or a commutator machine. The frequency of the voltage generated by the machine is independent of the speed and equal to the frequency of the exciter current flowing through the field winding 412.

Various modifications and changes may be made without departing from the spirit and the scope of the invention.

I claim as my invention:—

1. In a power distributing system containing an alternating current network, converter stations connected to said alternating current network, and direct current networks fed by said converter stations, a remote control plant adapted to operate by means of superposed control currents of another frequency than that of the network currents, and comprising a control station, a source of control current in said control station adapted to generate control energy of another frequency than that of the network currents and being connected with the conductors of said alternating current network, substations distributed along said alternating current network, and resonant receiving relays in said substations tuned to and adapted to absorb said control energy from the alternating current network, and means controlled by said relays for superposing on the direct current networks stronger control energy of a frequency equal for all substations and at the proper voltage phase.

2. In a power distributing system containing an alternating current network, converter stations connected to said alternating current network, and direct current networks fed by said converted stations, a remote control plant adapted to operate by means of superposed control currents of another frequency than that of the network currents, said plant comprising a control station, a source of control current in said control station adapted to generate control energy of another frequency than that of the network currents and being connected with the conductors of said alternating current network, substations distributed along said alternating current network, sources of superposition currents in said substations connected to the conductors of the direct current network, and means in said substations adapted to absorb the said control energy from the alternating current network and to control said source of superposition current in synchronism with the source of control current in the control station.

3. In a power distributing system containing an alternating current network, converter stations connected to said alternating current network, and direct current networks fed by said converter stations, a remote control plant adapted to operate by means of superposed control currents of another frequency than that of the network currents, and comprising a control station, a source of control current in said control station adapted to generate control energy of another frequency than that of the network currents and being connected with conductors of the said alternating current network, substations distributed along said alternating current network, resonant receiving relays in said substations tuned to and adapted to absorb said control energy from the alternating current network, and means controlled by said relays for superposing on the direct current networks stronger control energy of equal frequency.

4. In a power distributing system containing an alternating current network, converter stations connected to said alternating current network, and direct current networks fed by said converter stations, a remote control plant adapted to operate by means of superposed control currents of another frequency than that of the network currents, and comprising a control station, a source of control current in said control station adapted to generate control energy of another frequency than that of the network currents and being connected with conductors of the said alternating current network, substations distributed along said alternating current network, and means in said substations resonant to said control currents and adapted to absorb said control energy from the alternating current network and means controlled by said resonant means for superposing on the direct current networks stronger control energy of equal frequency and proper phase.

5. In a power distributing system containing an alternating current network, converter stations connected to said alternating current network, and direct current networks fed by said converter stations, a remote control plant adapted to operate by means of superposed control currents of another frequency than that of the network currents, and comprising a control station, a source of control current in said control station adapted to generate control energy of another frequency than that of the network currents and being connected with conductors of the said alternating current network, substations distributed along said alternating current networks, and means in said substations tuned to said control currents and adapted to absorb said control energy from the alternating current network and means controlled by said resonant means for superposing on the direct current networks under absorption of energy stronger control energy of a frequency equal for all substations and at the proper voltage phase.

6. In a power distributing system containing an alternating current network, converter stations connected to said alternating current network, and direct current networks fed by said converter stations, a remote control plant adapted to operate by means of superposed control currents of another frequency than that of the network currents, and comprising a control station, a source of control current in said control station adapted to generate control energy of another frequency than that of the network currents and being connected with conductors of the said alternating current network, substations distributed along said alternating current network, and comprising superposition units at the substations connected to the direct current networks, motors for driving said units, regulators and starters for controlling said motors, and means tuned to said control currents and adapted to absorb said control currents from the alternating current network for controlling said regulators and starters in synchronism.

7. In a power distributing system containing an alternating current network, converter stations connected to said alternating current network, and direct current networks fed by said converter stations, a remote control plant adapted to operate by means of superposed control currents of another frequency than that of the network currents, and comprising a control station, a control generator unit in the control station, and a synchronous machine in this unit connected to the alternating current network, and substations having superposition current units connected to the direct current networks, synchronous machines in said latter units connected to the alternating current network, and condensers in the connecting lines between said synchronous machines and the alternating current network and relays tuned to the superposed currents of said control station for controlling the superposition units in said substations.

8. In a power distributing system containing an alternating current network, converter stations connected to said alternating current network, and direct current networks fed by said converter stations, a remote control plant adapted to operate by means of superposed control currents of another frequency than that of the network currents, and comprising a control station, containing a source of single-phase current connected between a neutral conductor, such as ground, and a point of the polyphase network, and a source of polyphase current connected with each phase between different conductors of the said alternating current network.

9. In a power distributing system containing an alternating current network, converter stations connected to said alternating current network, and direct current networks fed by said converter stations, a remote control plant adapted to operate by means of superposed control currents of another frequency than that of the network currents, and comprising a control station, a source of control current in said control station adapted to generate control energy of another frequency than that of the network currents and being connected with conductors of the said alternating current network, substations distributed along said alternating current network, in at least one substation a source of single-phase superposition current connected between a neutral conductor, such as ground, and a point of the direct current network, a source of polyphase superposition current connected with each phase between a pair formed by the conductors of the direct current network and the said neutral conductor, and means tuned to and adapted to absorb the said control currents from the alternating current network and to control the said sources of superposition current in synchronism.

10. In a power distributing system containing a polyphase network, converter stations connected to said network, and direct current networks fed by said converter stations, a remote control plant adapted to operate by means of superposed control currents of another frequency than that of the network currents, and comprising a control station, in said control station a source of polyphase current connected phasewise to the individual phases of polyphase network, a source of single-phase control current connected at one pole to a neutral conductor, such as ground, inductance windings connected with the ends at one side to the conductors of the polyphase network and with the ends at the other side into a starpoint, and connected to the other pole of said source of single-phase control current.

11. In a power distributing system containing an alternating current network, converter stations connected to said alternating current network, and direct current networks fed by said converter stations, a remote control plant adapted to operate by means of superposed control currents of another frequency than that of the network currents, and comprising a control station, containing a control generator unit, a motor adapted to drive said unit, regulators and starters for controlling said motor, a selective relay tuned for certain frequencies and connected to a generator of said unit, selector switches connected between said relay and said generator, switches supervised by said relay and adapted to render operative a generator connected to the alternating current network of the said control generator unit, and substations containing superposition apparatus adapted to take up the control currents from the alternating current network and to supply stronger control currents to the direct current networks, and means in said substations responsive to the different relay frequencies in the control station and adapted to control said superposition apparatus.

12. In a power distributing system containing an alternating current network, converter stations connected to said alternating current network, and direct current networks fed by said converter stations, a remote control plant adapted to operate by means of superposed control currents of another frequency than that of the network currents, and comprising a control station, containing a control generator unit, a motor adapted to drive said unit, regulators and starters for controlling said motor, a selective relay tuned for certain frequencies and connected to a generator of said unit, selector switches connected between said relay and said generator, switches supervised by said relay and adapted to render operative a generator connected to the alternating current network of the said control generator unit, and substations containing selective relays tuned to the same frequencies as the selective relays of the control stations, superposition units connected to the alternating current networks, switches supervised by said selective relays and adapted to render operative said superposition unit.

13. In a power distributing system containing an alternating current network, converter stations connected to said alternating current network, and direct current networks fed by said converter stations, a remote control plant adapted to operate by means of superposed control currents of another frequency than that of the network currents, and comprising a control station, a source of control current in said control station adapted to generate control energy of another frequency than that of the network currents and being connected with conductors of the said alternating current network, substations distributed along said alternating current network, and containing means tuned to and adapted to absorb said control energy from the alternating current network and means controlled by said tuned means for superposing on the direct current networks stronger control energy of a frequency equal for all substations and at suitable voltage phase, sources of voltage connected in the sections of network conductors, which are to be blocked against the superposed currents, said voltage sources adapted to generate a countervoltage of equal frequency but opposite phase to the voltage, which is impressed upon the network conductors by a superposition unit.

14. In a power distributing system containing an alternating current network, converter stations connected to said alternating current network, and direct current networks fed by said converter stations, a remote control plant adapted to operate by means of superposed control currents of another frequency than that of the network currents, and comprising a control station, a source of control current in said control station adapted to generate control energy of another frequency than that of the network currents and being connected with conductors of the said alternating current network, substations distributed along said alternating current network, and means in said substations tuned to and adapted to absorb said control energy from the alternating current network and means, controlled by said tuned means for superposing on the direct current networks stronger control energy of a frequency equal for all substations and at suitable voltage phase, transformers connected with one of their windings to sections of network conductors, which are to be blocked against the control currents, and being connected with the other of their windings to a source of current adapted to induce in the first of said windings a countervoltage of equal frequency but opposite phase to that of the voltage which is impressed on the network conductors by a superposition unit.

15. In a power distributing system containing an alternating current network, converter stations connected to said alternating current network, and direct current networks equipped with steel armored cables fed from said converter stations, a remote control plant adapted to operate by means of superposed control currents of another frequency than that of the network currents, and comprising a control station, a source of control current in said control station adapted to generate control energy of another frequency than that of the network currents and being connected with conductors of the said alternating current network, substations distributed along said alternating current network, means in said substations tuned to and adapted to receive said control currents from the alternating current network and means controlled by said tuned means for superposing control currents of less than 300 cycles per second frequency upon said armored cables of the direct current networks, and receiving apparatus connected to said cables and tuned to frequencies of less than 300 cycles.

In testimony whereof I affix my signature.

OTTO MÜCK.